United States Patent
Hisano et al.

(10) Patent No.: US 11,616,661 B2
(45) Date of Patent: Mar. 28, 2023

(54) TRANSFER DEVICE AND TRANSFER METHOD

(71) Applicant: NIPPON TELEGRAPH AND TELEPHONE CORPORATION, Tokyo (JP)

(72) Inventors: Daisuke Hisano, Tokyo (JP); Yu Nakayama, Tokyo (JP); Takahiro Kubo, Tokyo (JP); Youichi Fukada, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 217 days.

(21) Appl. No.: 16/965,678

(22) PCT Filed: Feb. 1, 2019

(86) PCT No.: PCT/JP2019/003629
§ 371 (c)(1),
(2) Date: Jul. 29, 2020

(87) PCT Pub. No.: WO2019/151481
PCT Pub. Date: Aug. 8, 2019

(65) Prior Publication Data
US 2021/0036885 A1 Feb. 4, 2021

(30) Foreign Application Priority Data
Feb. 1, 2018 (JP) .............................. JP2018-016660

(51) Int. Cl.
*H04L 12/40* (2006.01)
*H04L 69/22* (2022.01)
*H04Q 11/00* (2006.01)

(52) U.S. Cl.
CPC ........ *H04L 12/40143* (2013.01); *H04L 69/22* (2013.01); *H04Q 11/0062* (2013.01); *H04Q 11/0005* (2013.01)

(58) Field of Classification Search
None
See application file for complete search history.

(56) References Cited

U.S. PATENT DOCUMENTS 8,036,214 B2 * 10/2011 Elliott ................. H04L 65/1026
370/522
9,628,382 B2 * 4/2017 Birrittella ............... H04L 47/17
(Continued)

FOREIGN PATENT DOCUMENTS

| JP | 2005101690 A | 4/2005 |
|---|---|---|
| JP | 2016005023 A | 1/2016 |
| JP | 6211218 B | 9/2017 |

OTHER PUBLICATIONS

IEEE 802.3br, Interspersing express traffic (IET) Task Force (TF), Baseline, Jan. 2015.
(Continued)

*Primary Examiner* — Henry Tsai
*Assistant Examiner* — Christopher A Bartels
(74) *Attorney, Agent, or Firm* — Harness, Dickey & Pierce, P.L.C.

(57) ABSTRACT

A transfer device for coupling a priority signal and a standard signal and transferring the signal includes a reception unit that receives a plurality of signals transmitted from a device connected to an opposite side of a transfer route, a separation unit that separates the signal into the priority signal and the standard signal, a signal defragmentation unit that defragments the plurality of standard signals, a multiplexing unit that multiplexes each of the priority signal and the standard signal, a priority control unit that determines a transfer order of the signals, a header information copy unit
(Continued)

that copy header information of the standard signal, a transmission unit that transmits the signal to a device connected to the transfer route, an interrupt transfer processing unit that perform an interruption process when the priority signal arrives during the transfer of the standard signal, a signal fragmentation unit that fragments the standard signal, a header information assignment unit that assigns the header information to the standard signal, and a transmission delaying unit that delays the transfer of the standard signal until the priority signal has been transferred.

5 Claims, 11 Drawing Sheets

(56) References Cited

U.S. PATENT DOCUMENTS

| | | | | |
|---|---|---|---|---|
| 10,305,802 | B2* | 5/2019 | Birrittella | H04L 47/39 |
| 11,108,675 | B2* | 8/2021 | Datta | H04L 43/50 |
| 11,274,929 | B1* | 3/2022 | Afrouzi | G05D 1/0272 |
| 2008/0056192 | A1* | 3/2008 | Strong | H04L 47/10 |
| | | | | 370/331 |
| 2012/0253847 | A1* | 10/2012 | Dell'Anno | G16H 40/67 |
| | | | | 705/2 |
| 2015/0222533 | A1* | 8/2015 | Birrittella | H04L 45/66 |
| | | | | 370/392 |
| 2015/0365340 | A1 | 12/2015 | Fukuda et al. | |
| 2017/0237659 | A1* | 8/2017 | Birrittella | H04L 45/74 |
| | | | | 370/392 |
| 2018/0376171 | A1* | 12/2018 | Dhandapani | G06F 3/048 |
| 2019/0004133 | A1* | 1/2019 | Li | G01R 33/5611 |
| 2019/0081903 | A1* | 3/2019 | Kobayashi | H04L 47/522 |
| 2019/0205244 | A1* | 7/2019 | Smith | G06F 3/065 |
| 2019/0373086 | A1* | 12/2019 | Qi | H04L 49/20 |
| 2020/0136953 | A1* | 4/2020 | Datta | H04L 47/245 |
| 2021/0243129 | A1* | 8/2021 | Sasu | H04L 47/2433 |

OTHER PUBLICATIONS

H. Bessho et al., Experimental Study of Frame Preemption for Ultra Low Latency Network, IEICE Technical Network, IEICE Technical Report, Jan. 2016, vol. 115, No. 404, pp. 97 to 102, ISSN 0913-5685.

International Search Report (In English and Japanese) issued in PCT/JP2019/003629, dated Mar. 12, 2019.

* cited by examiner

TRANSFER DEVICE AND TRANSFER METHOD

CROSS-REFERENCE TO RELATED APPLICATIONS

This application is a 371 National Stage of International Application No. PCT/JP2019/003629, filed on Feb. 1, 2019, which claims priority to Japanese Application No. 2018-016660, filed on Feb. 1, 2018. The entire disclosures of the above applications are incorporated herein by reference.

TECHNICAL FIELD

The present invention relates to a transfer device and a transfer method.

BACKGROUND ART

In an access network, a packet transfer device (hereinafter referred to as a "transfer device") that performs data traffic transfer processing concentrates data traffic for multiple services. The transfer device multiplexes the data traffic of multiple services and transfers the multiplexed data traffic through an edge router to a core network.
The core network is a large capacity backbone communication network that connects telecommunications carriers with each other. The transfer device identities a priority included in a Layer 2 frame and identifies a source user by use of a user identifier.

Figure 8:
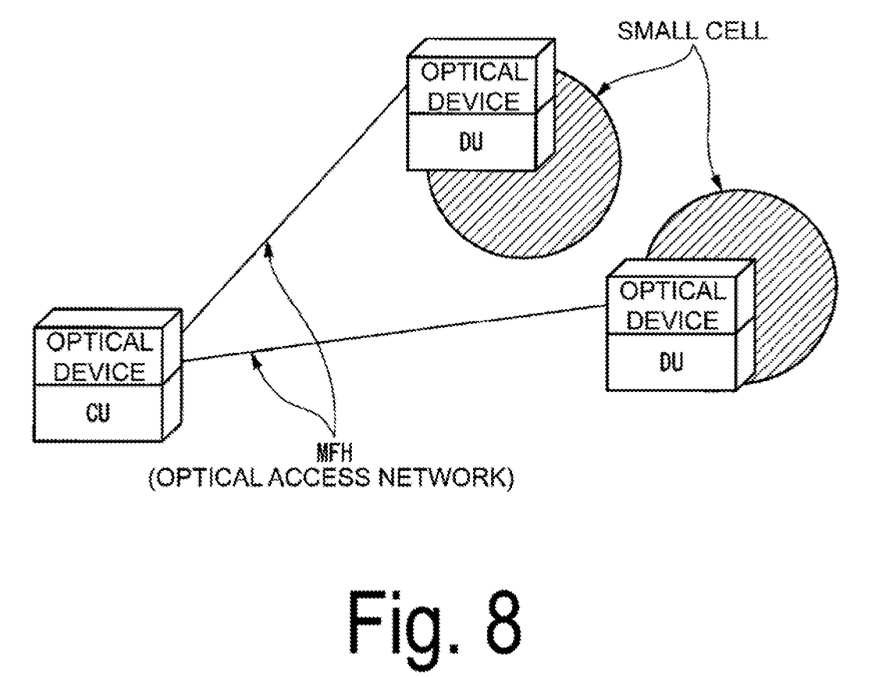
FIG. 8 is a diagram illustrating an example of a configuration of an MFH.

A new service for concentrated data traffic is mobile data traffic. One configuration of a radio access network includes a centralized radio access network (C-RAN) in which a large number of optical remote stations (Distributed Units (DUs)) are deployed with high density and a radio control device (Central Unit (CU)) aggregates radio signals to perform signal processing. The CU and the DUs are communicatively connected with each other over an optical access network called a mobile fronthaul (MFH)). An example of a configuration of this MFH is illustrated in FIG. 8.

In data traffic over the MFH, high level requirements for a delay in data transfer between the CU and the DUs (hereinafter referred to as "e2e (end-to-end) delay") are demanded. For example, in Third Generation Partnership Project (3GPP) TR 38.801 Option 6, the worst case value of e2e delay is defined as 250 microseconds (μs).

A priority service for which such low latency is required is referred to as an "Express service" below.
On the other hand, a standard service for which such low latency is not required is referred to as a "Normal service" below.

Figure 9:
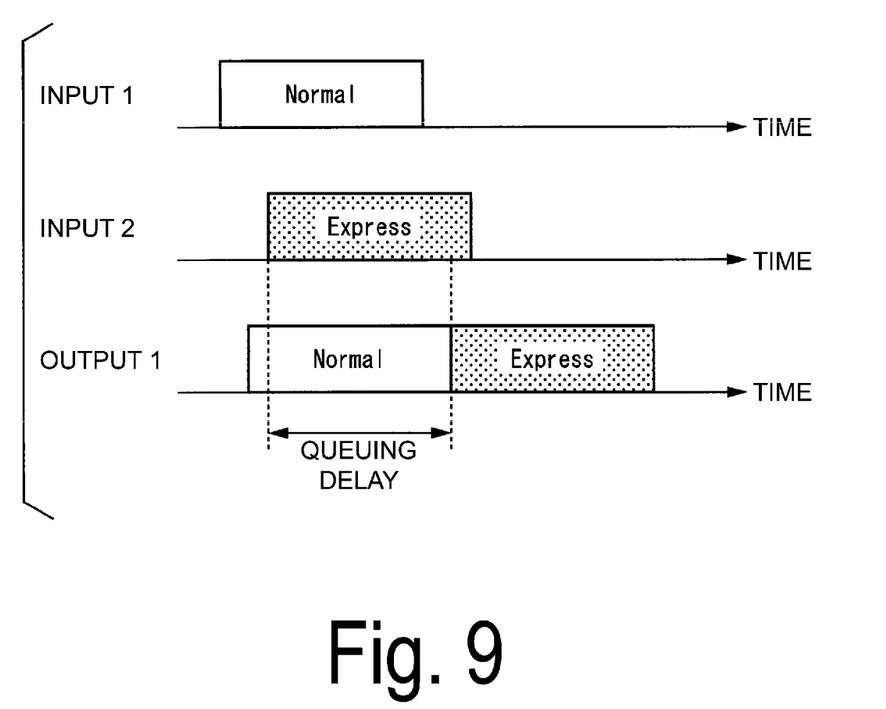
FIG. 9 is a diagram illustrating a general transfer method.

Examples of a delay constituting the e2e delay includes a processing delay generated by transfer processing in a layer 2 switch, a propagation delay that is a time taken for physical transmission between the layer 2 switches, and a queuing delay generated between packets. For example, as illustrated in FIG. 9, in a case that a Normal service frame (hereinafter referred to as a "Normal frame") arrives at a time slightly earlier than an Express service frame (hereinafter referred to as an "Express frame"), and these Normal and Express frames are output from an identical transmission port, the Express frame is not transferred and in a suspended state until transfer of the Normal frame is complete. This generates a delay, which is referred to as a queuing delay.

In order to minimize the queuing delay in the transfer of the Express frame, in Institute of Electrical and Electronics Engineers (IEEE) 802.3br Interspersing Express Traffic (IET), a Frame Preemption (FP) scheme for interrupt transfer of the Express frame is under study (NPL 1).

Figure 10:
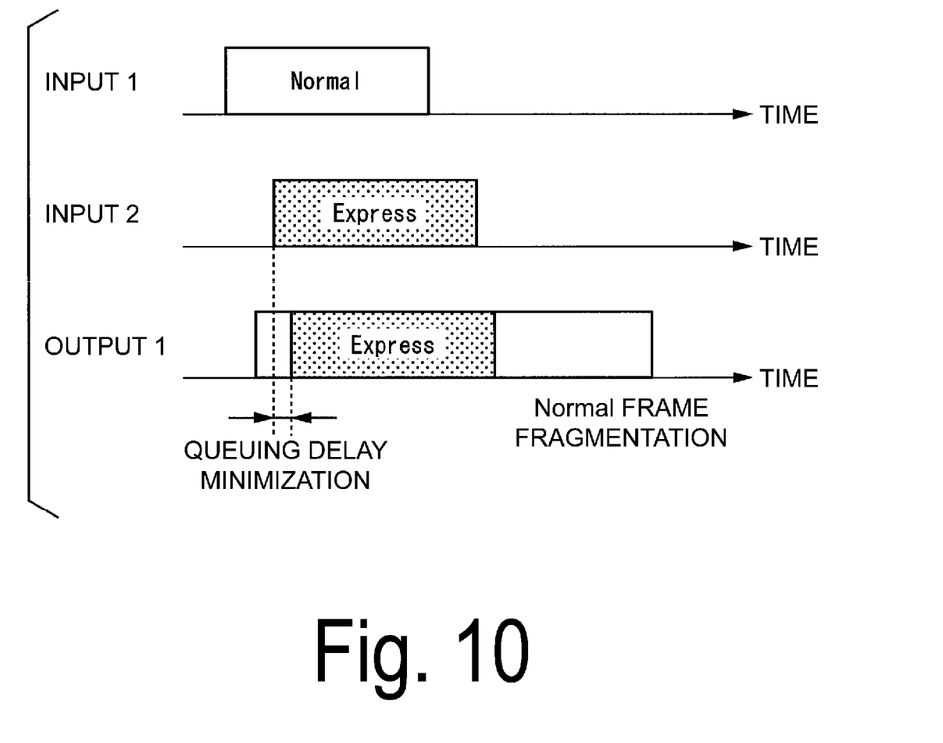
FIG. 10 is a diagram illustrating a transfer method according to an FP scheme.

A transfer method based on the FP scheme is illustrated in FIG. 10. In the FP scheme, in a case that an Express frame arrives when a Normal frame is transferred, the Normal frame is divided (fragmented). At this time, a header called "SMD-Ix" or "SMD-Cx" and "Frag Count" which dedicated to the FP scheme is added at a start of the fragmented Normal frame (hereinafter referred to as a "fragmented frame"). In addition, information referred to as "MFCS" is added at an end of each of fragment frames other than the last fragmented frame. Transfer processing for the fragmented frame is performed after completion of the transfer of the Express frame.

Figure 11:
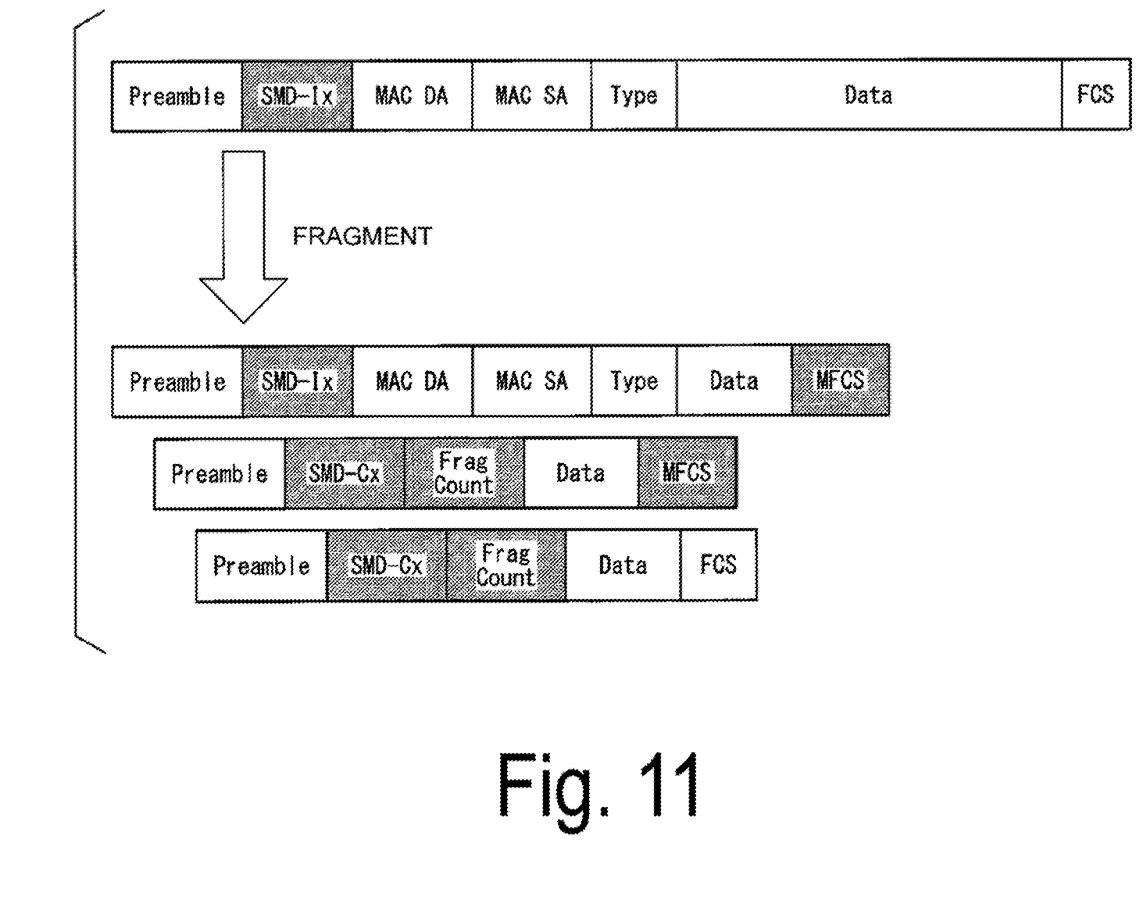
FIG. 11 is a diagram illustrating a frame configuration of normal frames in the FP scheme.

A frame configuration of a Normal frame in the FP scheme is illustrated in FIG. 11. "Preamble" is for synchronization for transmission and reception. "SMD-Ix" is added to a header of a non-fragmented Normal frame and a header of the first fragmented frame. "SMD-Cx" is added to a header(s) of a fragmented frame(s) other than the first fragment frame. "MAC DA" indicates a MAC address of a destination device. "MAC SA" indicates a Media Access Control (MAC) address of a source device. "Type" indicates a field identifying a higher layer protocol.

Note that the transfer device sets "SMD-Cx" in the headers of the fragmented frames fragmented from the identical Normal frame to the same value. The transfer device increments a value of "Frag Count" to check if an intermediate fragmented frame is not lost.

The transfer device checks the values of "SMD-Ix" and "SMD-Cx" when the transfer device defragments the fragment frames. The transfer device determines whether a plurality of fragment frames are fragment frames fragmented from the same normal frame on the basis of a result of checking the values. This allows the transfer device to correctly defragment the fragment frames fragmented from the same normal frame.

CITATION LIST

Non Patent Literature

NPL 1: "IEEE 802.3br Interspersing Express Traffic (IET) Task Force (TF) Baseline, January 2015", Internet <URL: http://www.ieee802.org/3/br/Baseline/8023-IET-TF-1405_Winkel-iet-Baseline-r4.pdf>

SUMMARY OF THE INVENTION

Technical Problem

However, when a bridge node corresponding to the FP scheme and a bridge node not corresponding to the FP scheme are both present in a communication network, fragment frames cannot be recognized at the bridge node not corresponding to the FP scheme and are discarded. In this case, there is a problem in that the normal frames are not correctly transferred.

The present invention has been made in view of such circumstances, and an object of the present invention is to provide a transfer device and a transfer method capable of generating fragmented frames that can be transferred even at a general-purpose bridge node.

Means for Solving the Problem

An aspect of the invention is a transfer device for coupling a signal for a priority service and a signal for a standard service and performing signal transfer to form a communication network, the transfer device including: a reception unit configured to receive a plurality of signals transmitted from a device connected to an opposite side of a transfer route in a transfer path of the communication network; a separation unit configured to separate the signal received by the reception unit into the signal for the priority service and the signal for the standard service; a signal defragmentation unit configured to hold a plurality of signals for the standard service separated by the separation unit and defragment the plurality of signals for the standard service; a multiplexing unit configured to multiplex each of the signal for the priority service separated by the separation unit and the signal for the standard service defragmented by the signal defragmentation unit; a buffer unit configured to hold the signal for each service multiplexed by the multiplexing unit; a priority control unit configured to determine a transfer order of the signals held by the buffer unit according to priorities of the signals; a header information copy unit configured to copy and hold header information of the signal for the standard service of which the transfer order has been determined by the priority control unit; a transmission unit configured to transmit the signal for each service to a device connected to the transfer route in the transfer path; an interrupt transfer processing unit configured to perform an interruption process when the signal for the priority service arrives during the transfer of the signal for the standard service; a signal fragmentation unit configured to fragment the signal for the standard service when the interruption process is performed by the interrupt transfer processing unit; a header information assignment unit configured to assign the header information held by the header information copy unit to the signal for the standard service fragmented by the signal fragmentation unit; and a transmission delaying unit configured to delay the transfer of the signal for the standard service until the signal for the priority service has been transferred.

Further, an aspect of the present invention is the transfer device, further including: a dummy information insertion unit configured to delete header information that is unnecessary for transfer between the transfer devices among the header information assigned by the header information assignment unit, and insert dummy information into a header area from which the header information has been deleted.

Further, an aspect of the present invention is the transfer device, wherein the header information copy unit discards header information of the transferred signal for the standard service among the held header information.

Further, an aspect of the present invention is the transfer device, further including: a signal re-transfer unit configured to hold the signal for the standard service of which the transfer order has been determined by the priority control unit, and re-transfer the held signal of a standard service in response to a re-transfer request from the device connected to the transfer route in the transfer path.

Further, an aspect of the invention is a transfer method by a transfer device for coupling a signal for a priority service and a signal for a standard service and performing signal transfer to form a communication network, the transfer method including: receiving a plurality of signals transmitted from a device connected to an opposite side of a transfer route in a transfer path of the communication network; separating the signal received in the receiving of the plurality of signals into the signal for the priority service and the signal for the standard service; holding a plurality of signals for the standard service separated in the separating of the signal and defragmenting the plurality of signals for the standard service; multiplexing each of the signal for the priority service separated in the separating of the signal and the signal for the standard service defragmented in the defragmenting of the signal; holding the signal for each service multiplexed in the multiplexing of the signal; determining a transfer order of the signals held in the holding of the signal according to priorities of the signals; copying and holding header information of the signal for the standard service of which the transfer order has been determined in the determining of the transfer order; transmitting the signal for each service to a device connected to the transfer route in the transfer path; performing an interruption process when the signal for the priority service arrives during the transfer of the signal for the standard service; fragmenting the signal for the standard service when the interruption process is performed in the performing of the transfer processing; assigning the header information held in the copying and holding of the header information to the signal for the standard service fragmented in the fragmenting of the signal; and delaying the transfer of the signal for the standard service until the signal for the priority service has been transferred.

Effects of the Invention

According to the present invention, it is possible to generate fragmented frames that can be transferred even at a general-purpose bridge node.

DESCRIPTION OF EMBODIMENTS

First Embodiment

Hereinafter, a first embodiment of the present invention will be described.

A transfer device 1 according to a first embodiment is a bridge node at which an FP scheme has been implemented.

The transfer device 1 couples a signal for an express service (a priority service) and a signal for a normal service (a standard service) to perform signal transfer, thereby forming a communication network. Hereinafter, a configuration of the transfer device 1 will be described with reference to the drawings.

Configuration of Transfer Device

Figure 1:
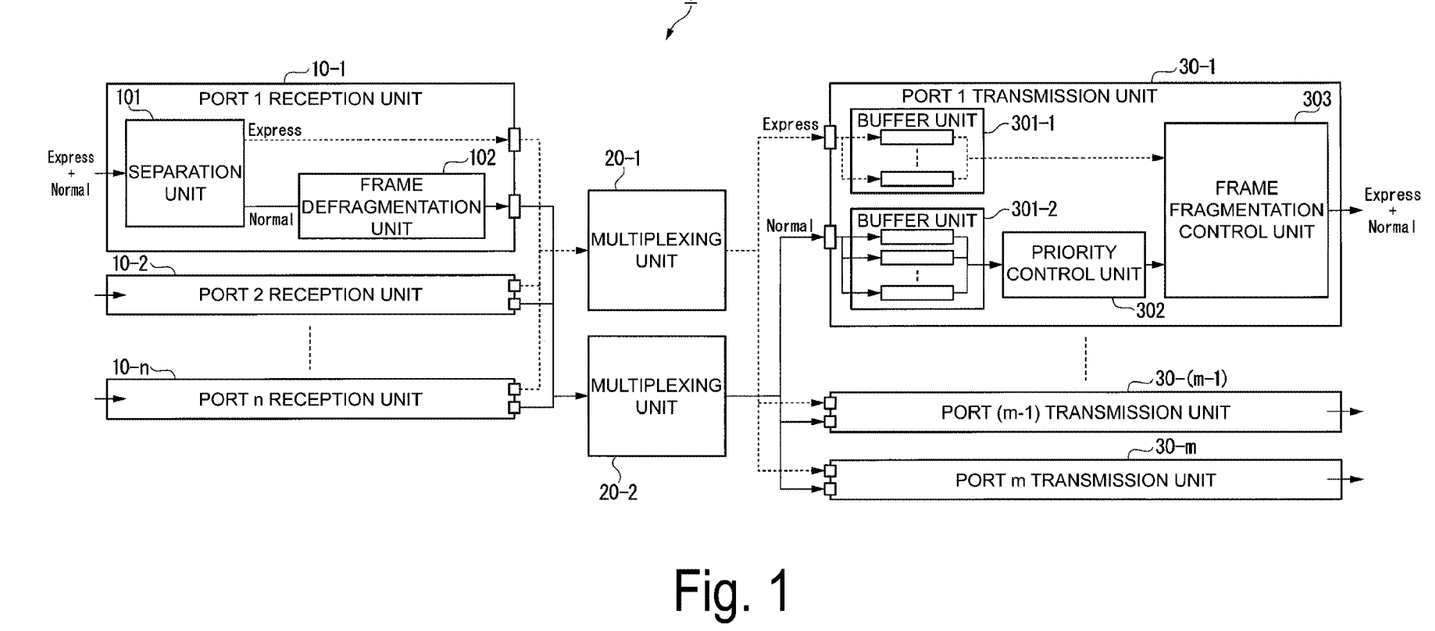
FIG. 1 is a block diagram illustrating a functional configuration of a transfer device according to a first embodiment.

FIG. 1 is a block diagram illustrating a functional configuration of the transfer device 1 according to the first embodiment. As illustrated in FIG. 1, the transfer device 1 includes n reception ports (port 1 reception unit 10-1, port 2 reception unit 10-2, and port n reception unit 10-*n*), two multiplexing units (multiplexing units 20-1 and 20-2), and m transmission ports (port 1 transmission unit 30-1, port (m-1) transmission unit 30-(*m*-1), and port m transmission unit 30-*m*.

The port 1 reception unit 10-1, the port 2 reception unit 10-2, and the port n reception unit 10-*n* are hereinafter referred to as a "reception unit 10" when it is not necessary to distinguish the port 1 reception unit 10-1, the port 2 reception unit 10-2, and the port n reception unit 10-*n* in the description. Further, the port 1 transmission unit 30-1, the port (m-1) transmission unit 30-(*m*-1), and the port m transmission unit 30-*m* are hereinafter referred to as a "transmission unit 30" when it is not necessary to distinguish the port 1 transmission unit 30-1, the port (m-1) transmission unit 30-(*m*-1), and the port m transmission unit 30-*m* in the description.

The reception unit 10 receives a plurality of signals transmitted from other bridge nodes (transfer devices or termination devices) connected to an opposite side of a transfer route in a transfer path of the communication network. The signals received by the reception unit 10 include an express frame (a signal for a priority service) and a normal frame (a signal for a standard service). As illustrated in FIG. 1, the reception unit 10 includes a separation unit 101 and a frame defragmentation unit 102.

The separation unit 101 separates the received signals into express frames and normal frames.
The separation unit 101 outputs the separated express frames to the multiplexing unit 20-1 and the multiplexing unit 20-2. Further, the separation unit 101 outputs the separated normal frames to the frame defragmentation unit 102. The separated normal frames may be fragment frames (fragmented normal frames).

The frame defragmentation unit 102 acquires the normal frames output from the separation unit 101. When the acquired normal frames are the fragment frames, the frame defragmentation unit 102 defragments a plurality of acquired fragment frames. The frame defragmentation unit 102 outputs the defragmented normal frames to the multiplexing unit 20-1 and the multiplexing unit 20-2.

The multiplexing unit 20-1 acquires the express frames output from the respective separating units 101. The multiplexing unit 20-1 multiplexes the acquired express frames. The multiplexing unit 20-1 outputs the multiplexed express frames to each of the transmission units 30.

The multiplexing unit 20-2 acquires the normal frames output from the respective frame defragmentation units 102. The multiplexing unit 20-2 multiplexes the acquired normal frames. The multiplexing unit 20-2 outputs the multiplexed normal frames to the respective transmission units 30.

The transmission unit 30 transmits the signal for each service (the express frames and the normal frames) to a bridge node (another transfer device) connected to a transfer route in the transfer path. The transmission unit 30 acquires the express frames output from the multiplexing unit 20-1 and the normal frames output from the multiplexing unit 20-2. As illustrated in FIG. 1, the transmission unit 30 includes a buffer unit 301-1, a buffer unit 301-2, a priority control unit 302, and a frame fragmentation control unit 303.

The buffer unit 301-1 queues (holds) the acquired express frames for each service according to each service class. The buffer unit 301-1 outputs the express frames to the frame fragmentation control unit 303.
The buffer unit 301-2 queues (holds) the acquired normal frames for each service according to each service class. The buffer unit 301-2 outputs the normal frames to the priority control unit 302.

The priority control unit 302 acquires normal frames output from the buffer unit 301-2. The priority control unit 302 determines a transfer order of the normal frames buffered by the buffer unit 301-2 according to priorities of the normal frames. The priority control unit 302 outputs the normal frames to the frame fragmentation control unit 303 according to the determined transfer order.

The frame fragmentation control unit 303 acquires the express frames output from the buffer unit 301-1 and the normal frames output from the buffer unit 301-2. The frame fragmentation control unit 303 transfers the express frames and the normal frames to the bridge node that is a transmission destination using a transfer method using an FP scheme described above.

Frame Configuration

Figure 2:
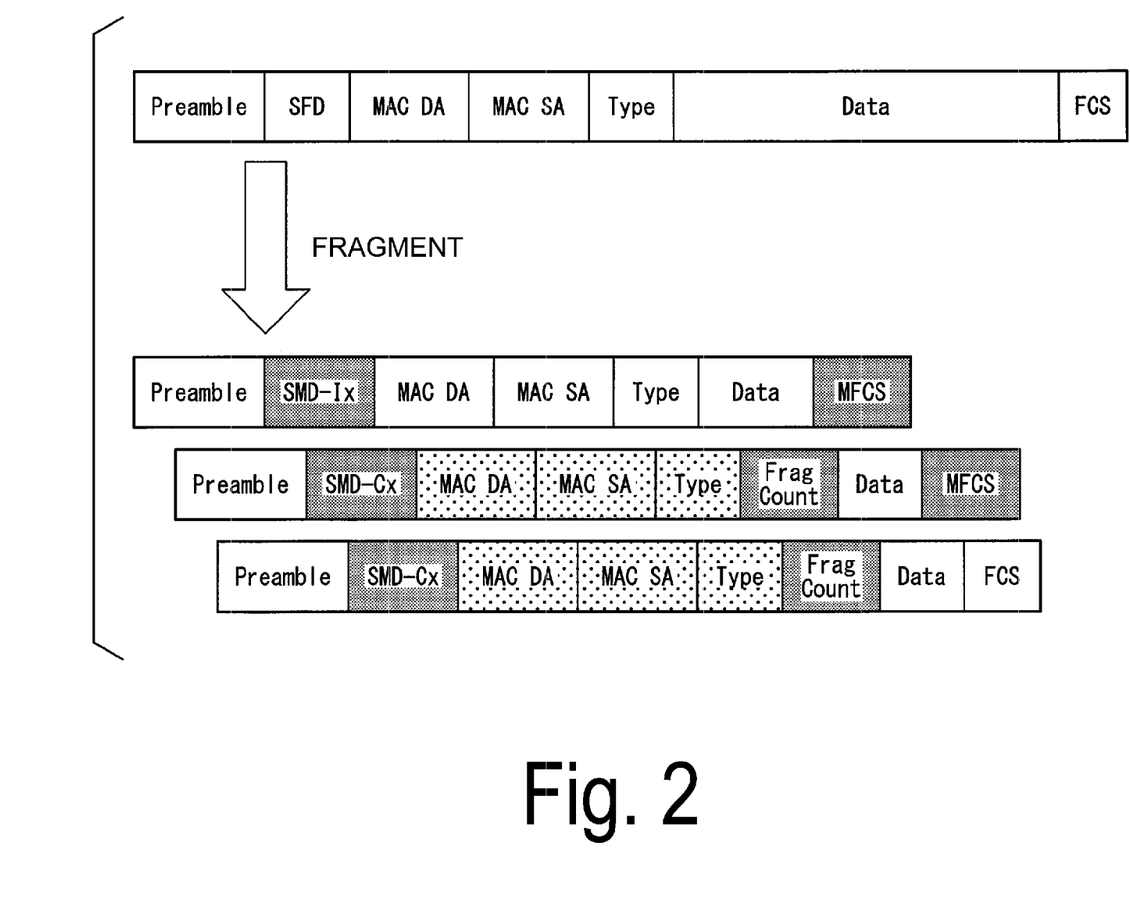
FIG. 2 is a diagram illustrating a frame configuration of a frame that is used in the first embodiment.

Next, an example of a frame configuration will be described with reference to the drawings. FIG. 2 is a diagram illustrating a frame configuration of the frame that is used in the first embodiment. "MAC DA," "MAC SA," and "Type" are also assigned to a header of a fragment frame other than a leading fragment frame when fragmentation is performed, as illustrated in FIG. 2. The same values as the values of "MAC DA," "MAC SA," and "Type" of the leading fragment frame are set in the assigned "MAC DA," "MAC SA," and "Type," respectively.

In the first embodiment, it is assumed that the bridge node performs a transfer process on the basis of the values of "MAC DA," "MAC SA," and "Type." When the bridge node performs the transfer process on the basis of other values, assignment to the header after fragmentation may be performed on the basis of such values.

Configuration of Frame Fragmentation Control Unit

Figure 3:
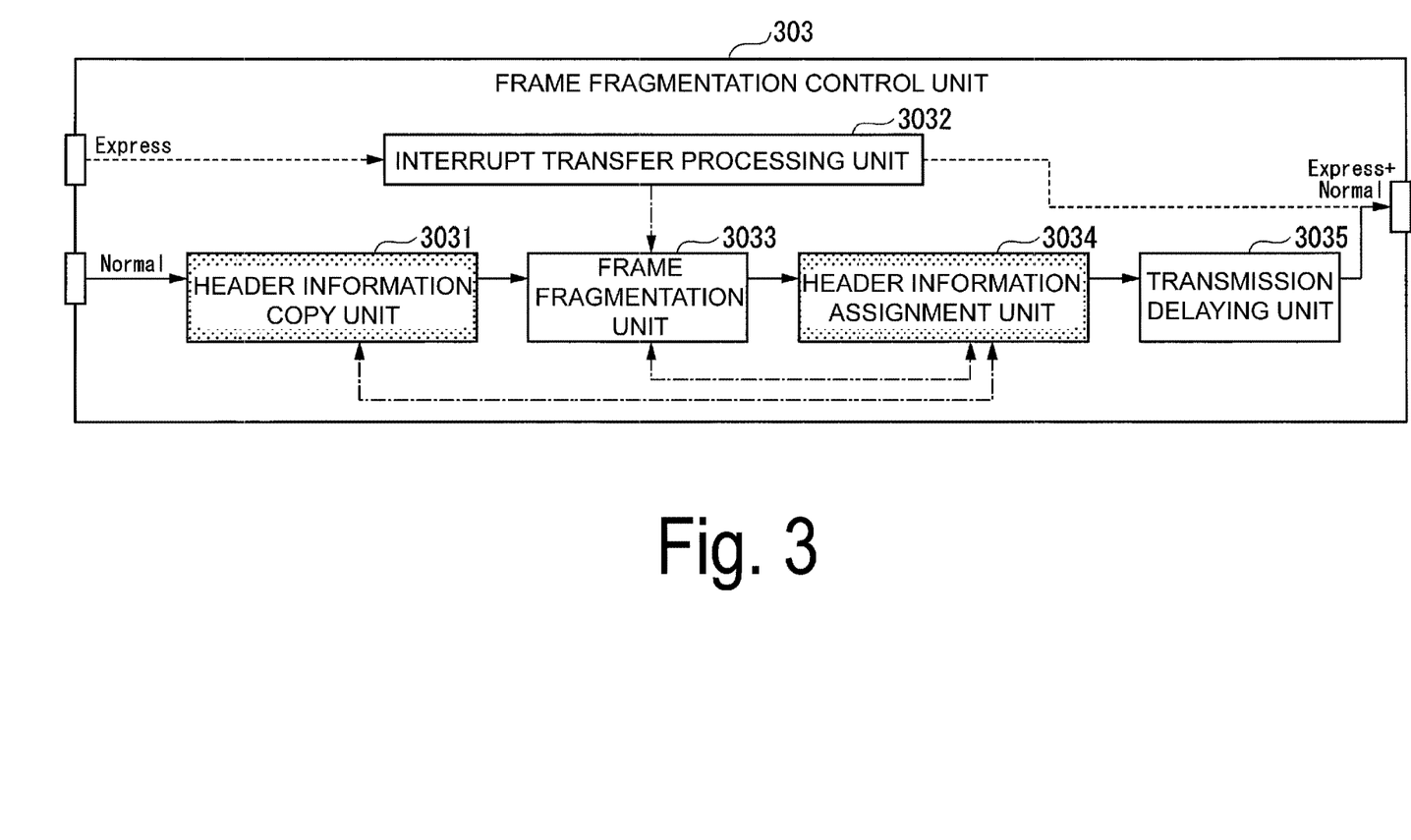
FIG. 3 is a block diagram illustrating a configuration of a frame fragmentation control unit of the transfer device according to the first embodiment.

Hereinafter, a configuration of the frame fragmentation control unit 303 will be described. FIG. 3 is a block diagram illustrating a configuration of the frame fragmentation control unit 303 of the transfer device 1 according to the first embodiment. The frame fragmentation control unit 303 includes a header information copy unit 3031, an interrupt transfer processing unit 3032, a frame fragmentation unit 3033, a header information assignment unit 3034, and a transmission delaying unit 3035, as illustrated in FIG. 3.

The header information copy unit 3031 (a header information duplication unit) acquires the normal frames output from the priority control unit 302. The header information copy unit 3031 copies and holds, for example, "MAC DA," "MAC SA," and "Type," which are header information of the acquired normal frames. The header information copy unit 3031 outputs the acquired normal frames to the frame fragmentation unit 3033.

The interrupt transfer processing unit 3032 performs an interruption process when the express frames arrive during transfer of the normal frames. Specifically, when the express frames arrive during the transfer of the normal frames, the interrupt transfer processing unit 3032 outputs a command for fragmenting the normal frames to the frame fragmentation unit 3033.

The frame fragmentation unit 3033 (a signal fragmentation unit) acquires the normal frames output from the header information copy unit 3031.

When an interruption process is performed by the interrupt transfer processing unit 3032 (specifically, when a command output from the interrupt transfer processing unit 3032 has been acquired), the frame fragmentation unit 3033 fragments the acquired normal frames. The frame fragmentation unit 3033 outputs the fragment frames (fragmented normal frames) to the header information assignment unit 3034. The frame fragmentation unit 3033 outputs notification information indicating that the fragmentation of the normal frames has been performed, to the header information assignment unit 3034.

Further, when the interruption process is not performed, the frame fragmentation unit 3033 outputs the acquired normal frames to the header information assignment unit 3034.

The header information assignment unit 3034 acquires the normal frames or fragment frames output from the frame fragmentation unit 3033.

Further, the header information assignment unit 3034 acquires notification information indicating that the normal frames have been fragmented, which has been output from the frame fragmentation unit 3033. When the header information assignment unit 3034 has acquired the notification information, the header information assignment unit 3034 reads the header information held by the header information copy unit 3031. The header information assignment unit 3034 assigns the header information read from the header information copy unit 3031 to the acquired fragment frames. The header information assignment unit 3034 outputs the normal frames or the fragment frames to which the header information has been assigned, to the transmission delaying unit 3035.

The transmission delaying unit 3035 delays transfer of the normal frames until the express frames have been transferred.

Operation of Transfer Device

Figure 4:
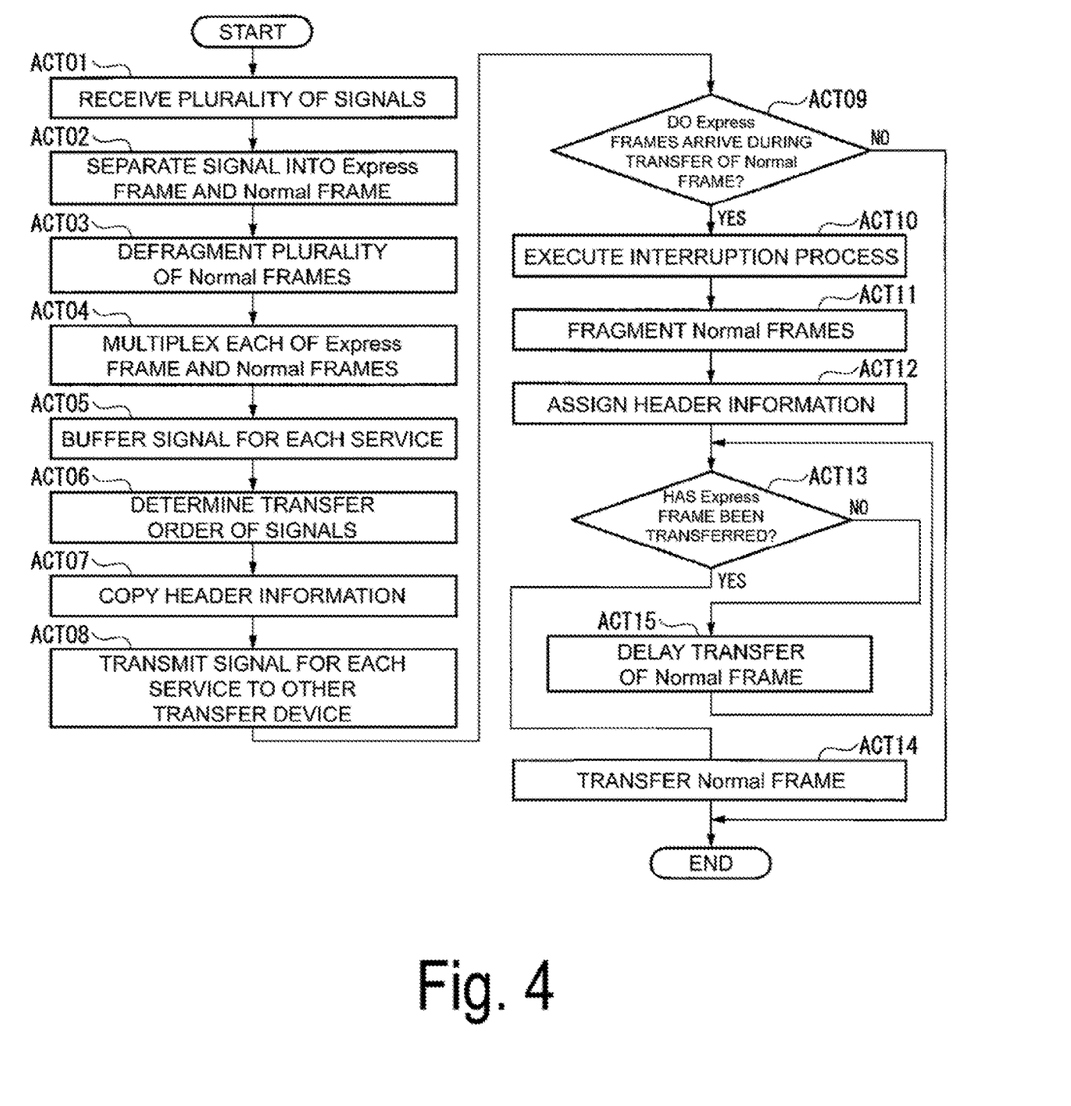
FIG. 4 is a flowchart illustrating an operation of the transfer device according to the first embodiment.

Hereinafter, an example of an operation of the transfer device 1 will be described with reference to the drawings. FIG. 4 is a flowchart illustrating the operation of the transfer device 1 according to the first embodiment.

The reception unit 10 receives a plurality of signals (express frames and normal frames) transmitted from the bridge node (another transfer device or termination device) connected to the opposite side of the transfer route in the transfer path of the communication network (ACT01). The separation unit 101 separates the signal received by the reception unit 10 into express frames (the signal for the priority service) and normal frames (a signal for a standard service) (ACT02).

The frame defragmentation unit 102 (a signal defragmentation unit) temporarily holds a plurality of normal frames (fragment frames) separated by the separation unit 101, and defragments the plurality of fragment frames (ACT03).

The multiplexing unit 20-1 multiplexes each of the express frames separated by the separation unit 101 and the multiplexing unit 20-2 multiplexes the normal frames defragmented by the frame defragmentation unit 102 (ACT04).

The buffer unit 301-1 temporarily butlers (holds) the signals for each service (the express frames) multiplexed by the multiplexing unit 20-1, and the buffer unit 301-2 temporarily buffers (holds) the signals (the normal frames) for the respective services multiplexed by the multiplexing unit 20-2 (ACT05).

The priority control unit 302 determines a transfer order of the signals (the normal frames) buffered (held) by the buffer unit 301-2 according to priorities of the signals (ACT06).

The header information copy unit 3031 copies (duplicates) and holds the header information of the normal frames of which the transfer order has been determined by the priority control unit 302 (ACT07).

The transmission unit 30 transmits the signal for each service to a bridge node (another transfer device) connected to a transfer route in the transfer path (ACT08).

When express frames arrive during the transfer of the normal frame (ACT09: YES), the interrupt transfer processing unit 3032 executes the interruption process (ACT10). When express frames do not arrive during the transfer of the normal frame (ACT09: NO), the process of the flowchart illustrated in FIG. 4 ends.

When the interruption process is performed by the interrupt transfer processing unit 3032, the frame fragmentation unit 3033 fragments the normal frames (ACT11).

The header information assignment unit 3034 reads the header information held by the header information copy unit 3031, and assigns the header information to the fragment frame fragmented by the frame fragmentation unit 3033 (ACT12).

When the express frame has not been transferred (ACT13: NO), the transmission delaying unit 3035 delays the transfer of the normal frame until the express frames have been transferred (ACT15).

When the express frames have been transferred (ACT13: YES), the transmission delaying unit 3035 transfers the normal frames (ACT14).

Then, the process of the flowchart illustrated in FIG. 4 ends.

Second Embodiment

In the first embodiment, the header information assignment unit 3034 has assigned the header information of all the normal frames to the fragment frame. On the other hand, in the second embodiment, the header information assignment 3034 assigns dummy information to the fragment frames, instead of assigning header information not used for transfer among the header information of the acquired normal frames to the fragment frames.

This allows the transfer device according to the second embodiment to shorten a time required for assignment of the header information, as compared to the transfer device 1 according to the first embodiment.

Figure 5:
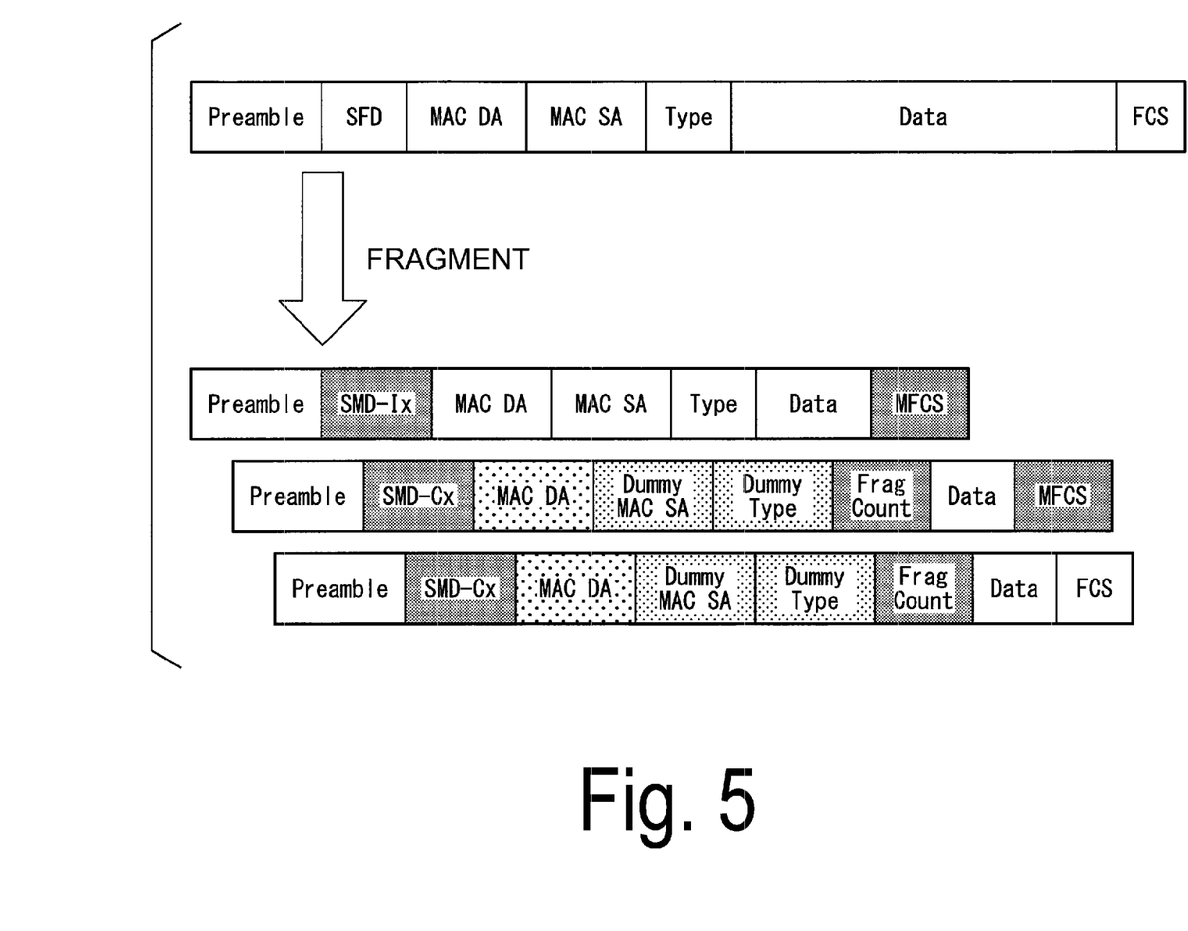
FIG. 5 is a diagram illustrating an example of a frame configuration of a frame that is used in a second embodiment.

FIG. 5 is a diagram illustrating an example of a frame configuration of a frame that is used in the second embodiment.

For example, in Ethernet (registered trademark), "MAC DA" is header information that is used for a transfer process, and a transfer destination port is designated by a value set in "MAC DA". On the other hand, values set in "MAC SA" and "Type" are not used for a transfer process. Thus, in header information to be assigned to the fragment frame other than the leading fragment frame, dummy information is set in header areas in which the values of "MAC SA" and "Type" that are not used for the transfer process are set, as illustrated in FIG. 5.

For example, in a protocol such as Ethernet (registered trademark) or Internet Protocol (IP), the number of bytes in a header area is a fixed number. Accordingly, even in a case in which some of the header information is not assigned, assignment of the dummy information is required instead.

Figure 6:
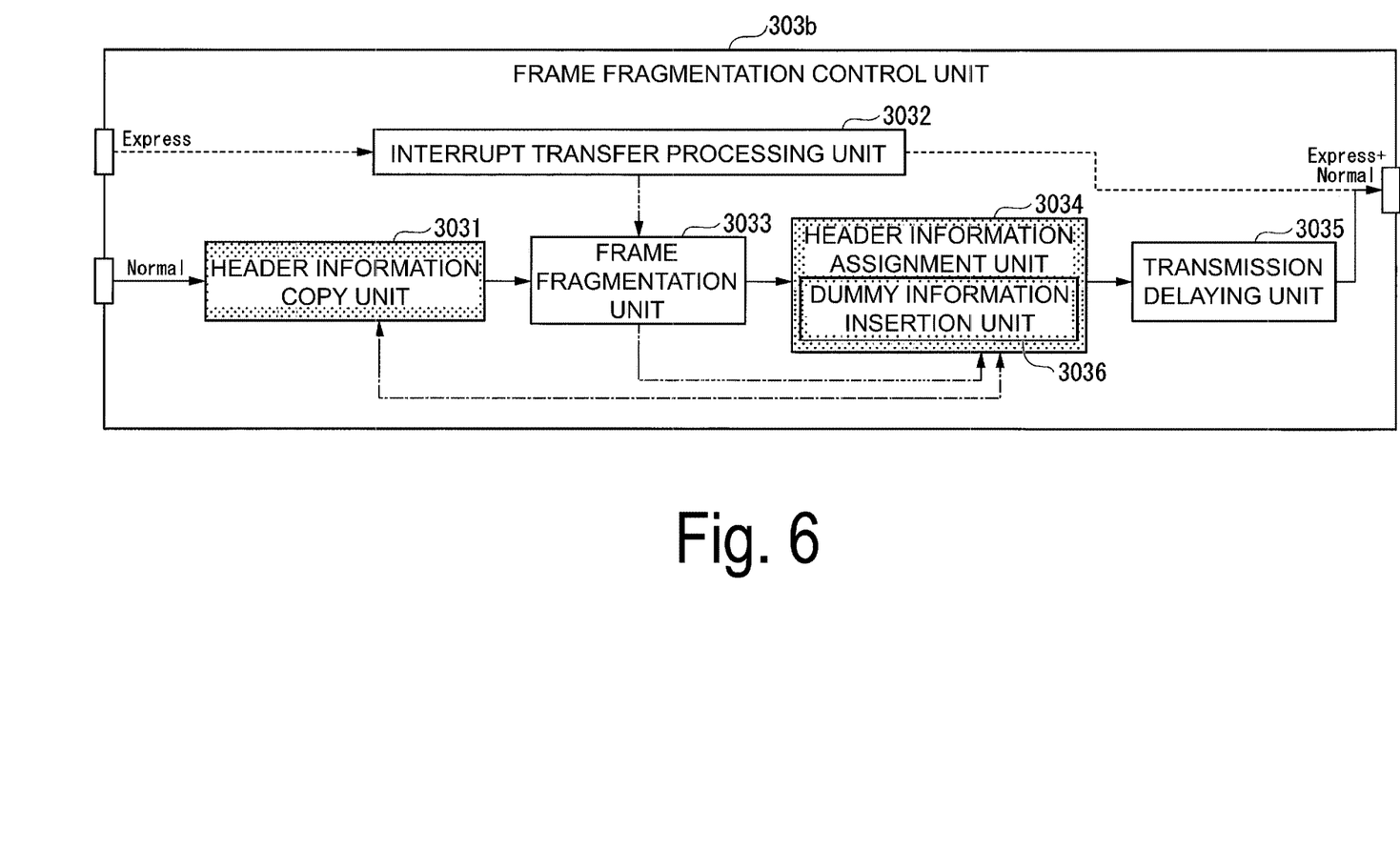
FIG. 6 is a block diagram illustrating a configuration of a frame fragmentation control unit of a transfer device according to the second embodiment.

FIG. 6 is a block diagram illustrating a configuration of a frame fragmentation control unit 303b of the transfer device according to the second embodiment. A main difference between the frame fragmentation control unit 303b and the frame fragmentation control unit 303 according to the first embodiment is that the header information assignment unit 3034 includes a dummy information insertion unit 3036. The dummy information insertion unit 3036 deletes header information unnecessary for transfer between transfer devices among the header information assigned to the fragment frames by the header information assignment unit 3034, and inserts the dummy information into a header area from which the header information has been deleted.

Third Embodiment

In the first embodiment, the header information copy unit 3031 has copied and held the header information of the normal frames output from the priority control unit 302. However, for example, in an environment in which the transfer device receives a large number of normal frames, such as in a case in which the transfer device receives signals from a plurality of bridge nodes, the header information copy unit 3031 needs to include a storage medium having a large storage capacity.

On the other hand, in the third embodiment, the header information copy unit 3031 discards the header information of the normal frame that has been transmitted to the bridge node, which is a transmission destination, among the held header information.

For example, the transmission delaying unit 3035 outputs the header information assigned to the transmitted normal frame to the header information copy unit 3031 when the normal frame has been transmitted to the bridge node, which is a transmission destination. When the header information copy unit 3031 acquires the header information output from the transmission delaying unit 3035, the header information copy unit 3031 deletes header information corresponding to the acquired header information from the held header information.

This allows the transfer device according to the third embodiment to further decrease a storage capacity required to hold the header information in the header information copy unit 3031, as compared to the transfer device 1 according to the first embodiment.

Fourth Embodiment

In the first embodiment, the header information copy unit 3031 has copied and held the header information of the normal frames output from the priority control unit 302. On the other hand, in the fourth embodiment, not only the header information, but also all of the normal frames are copied and held. This allows the transfer device according to the fourth embodiment to re-transfer fragment frames using the held normal frames when some or all of the fragment frames have been corrupted during transfer between bridge nodes.

In the related art, for example, in a case in which transfer is performed from a transfer source node to a transfer destination node via a plurality of relay nodes, the transfer destination node detects a frame loss and sends a re-transfer request to the transfer source node in the case in which the frame loss occurs in the relay node or the relay link. In this method of the related art, a delay for one round-trip between the transfer source node and the transfer destination node occurs.

On the other hand, in a communication network using the transfer device according to the fourth embodiment as a relay node, the transfer device can perform re-transfer using the temporarily held normal frames instead of the transfer source node. This allows the transfer device according to the fourth embodiment to reduce the delay required for re-transfer of the normal frames, as compared to the transfer device 1 according to the first embodiment.

Figure 7:
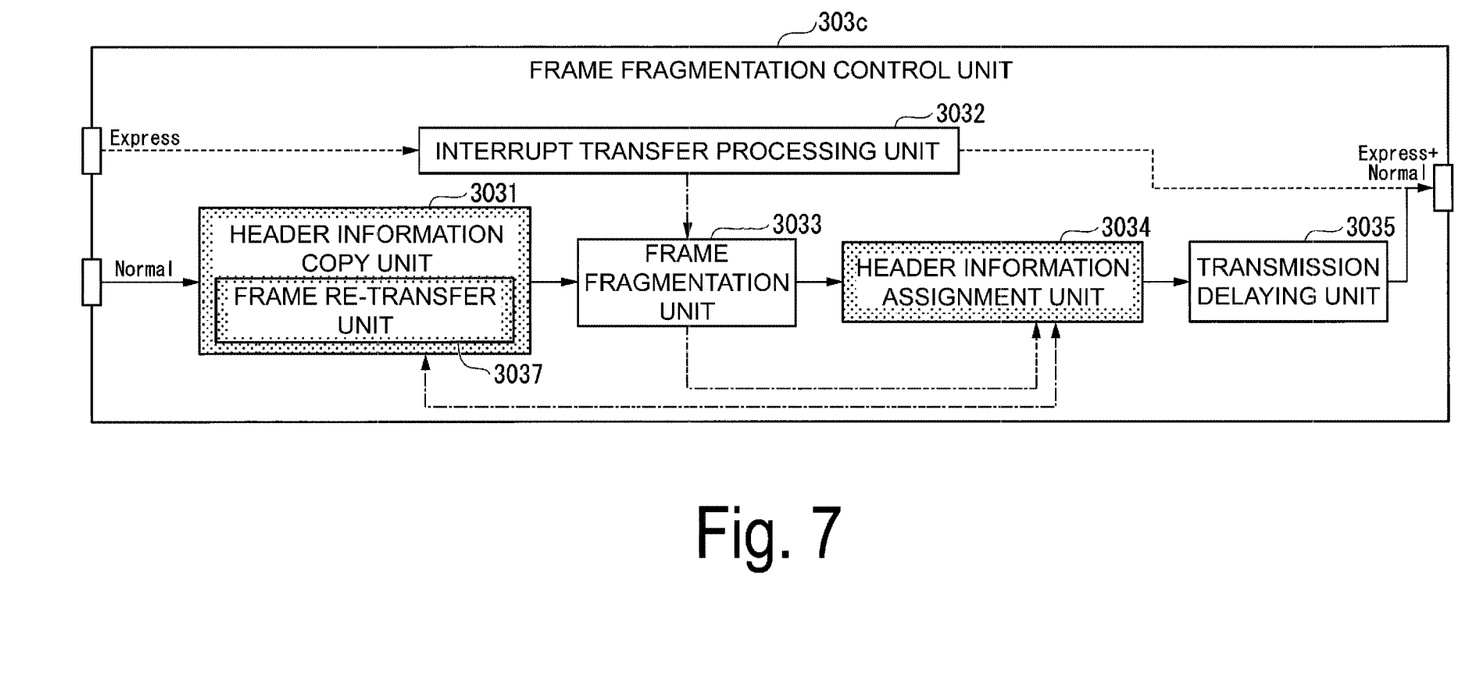
FIG. 7 is a block diagram illustrating a configuration of a frame fragmentation control unit of a transfer device according to a fourth embodiment.

FIG. 7 is a block diagram illustrating a configuration of a frame fragmentation control unit 303c of the transfer device according to the fourth embodiment. A main difference between the frame fragmentation control unit 303c and the frame fragmentation control unit 303 according to the first embodiment is that the header information copy unit 3031 includes a frame re-transfer unit 3037 (a signal re-transfer unit). The frame re-transfer unit 3037 holds the normal frame of which the transfer order has been determined by the priority control unit 302, and re-transfers the held normal signal in response to a re-transfer request from a bridge node (another device) connected to a transfer route in the transfer path.

As described above, the transfer device according to the embodiment of the present invention is a packet transfer device that performs transfer using an FP scheme, and header information that is the same as the header of the normal frame before fragmentation is assigned to the fragment frame (fragmented normal frame) at the time of transmission.

By including the above-described configuration, the transfer device according to the embodiments of the present invention can generate fragmented frames that can be transferred even at a general-purpose bridge node such as a bridge node not corresponding to the FP scheme. This allows a communication network in which the fragmented frames are transferred without being discarded, to be constructed according to the transfer device according to the embodiments of the present invention.

A part or all of the transfer device according to the embodiments described above may be realized by a computer. In this case, the part or all of the transfer device may be realized by recording a program for realizing a control function on a computer-readable recording medium, loading the program recorded on the recording medium into a computer system, and executing the program.

Here, it is assumed that the "computer system" is a computer system built into the transfer device, which includes an OS or hardware such as a peripheral device. Further, the "computer-readable recording medium" refers to a portable medium such as a flexible disk, a magneto-optical disc, a ROM, or a CD-ROM, or a storage device such as a hard disk built into the computer system.

Further, the "computer-readable recording medium" may also include a recording medium that dynamically holds a program for a short period of time, such as a communication line when the program is transmitted over a network such as the Internet or a communication line such as a telephone line or a recording medium that holds a program for a certain period of time, such as a volatile memory inside a computer system including a server and a client in such a case. Further, the program may be a program for realizing some of the above-described functions or may be a program capable of realizing the above-described functions in a combination with a program already recorded on the computer system.

Further, a part or all of the transfer device in the embodiment described above may be realized as an integrated circuit such as a large scale integration (LSI). Respective functional blocks of the transfer device may be individually configured as processors, or some or all of the functional blocks may be integrated into a processor. Further, an integrated circuit realization scheme is not limited to the LSI, and some or all of the functional blocks of the transfer device may be realized by a dedicated circuit or a general-purpose processor. Further, in a case in which an integrated circuit realization technology with which the LSI is replaced appears with the advance of a semiconductor technology, an integrated circuit according to the technology may be used.

REFERENCE SIGNS LIST

1: Transfer device
10: Reception unit
20-1: Multiplexing unit
20-2: Multiplexing unit
30: Transmission unit
101: Separation unit
102: Frame defragmentation unit
301-1: Buffer unit
301-2: Buffer unit
302: Priority control unit
303: Frame fragmentation control unit
3031: Header information copy unit
3032 Interrupt transfer processing unit
3033: Frame fragmentation
3034: Header information assignment unit
3035: Transmission delaying unit
3036: Dummy information insertion unit
3037: Frame re-transfer unit

The invention claimed is:

1. A transfer device for coupling a signal for a priority service and a signal for a standard service and performing signal transfer to form a communication network, the transfer device comprising:
a processor; and
a storage medium having computer program instructions stored thereon, wherein the computer program instructions, when executed by the processor, perform to:
receive a plurality of signals transmitted from a device connected to an opposite side of a transfer route in a transfer path of the communication network;
separate the signals into the signal for the priority service and the signal for the standard service;
hold a plurality of signals for the standard service and defragment the plurality of signals for the standard service;
multiplex each of the signal for the priority service and the signal for the standard service
hold the signal for each service
determine a transfer order of the signals according to priorities of the signals;
copy and hold header information of the signal for the standard service of which the transfer order has been determined
transmit the signal for each service to a device connected to the transfer route in the transfer path;
perform an interruption process when the signal for the priority service arrives during the transfer of the signal for the standard service;
fragment the signal for the standard service when the interruption process is performed
assign the header information that is used for a transfer process to the signal for the standard service; and
delay the transfer of the signal until the signal for the priority service has been transferred.

2. The transfer device according to claim 1, wherein the computer program instructions further perform to
delete header information that is unnecessary for transfer between the transfer devices among the header information and insert dummy information which has same number of bytes as the deleted header information into a whole header area from which the header information has been deleted.

3. The transfer device according to claim 1 wherein the computer program instructions further perform to:
discard header information of the transferred signal for the standard service among the held header information.

4. A transfer device for coupling a signal for a priority service and a signal for a standard service and performing signal transfer to form a communication network, the transfer device comprising:
a processor; and
a storage medium having computer program instructions stored thereon, wherein the computer program instructions, when executed by the processor, perform to:
receive a plurality of signals transmitted from a device connected to an opposite side of a transfer route in a transfer path of the communication network;
separate the signals into the signal for the priority service and the signal for the standard service;
hold a plurality of signals for the standard service and defragment the plurality of signals for the standard service;
multiplex each of the signal for the priority service and the signal for the standard service;
hold the signal for each service;
determine a transfer order of the signals according to priorities of the signals;
copy and hold header information of the signal for the standard service of which the transfer order has been determined;
transmit the signal for each service to a device connected to the transfer route in the transfer path;
perform an interruption process when the signal for the priority service arrives during the transfer of the signal for the standard service;
fragment the signal for the standard service when the interruption process is performed;
assign the header information to the signal for the standard service;
delay the transfer of the signal until the signal for the priority service has been transferred; and
hold the signal for the standard service of which the transfer order has been determined, and re-transfer the held signal of the standard service in response to a re-transfer request from the device connected to the transfer route in the transfer path.

5. A transfer method for coupling a signal for a priority service and a signal for a standard service and performing signal transfer to form a communication network, the transfer method comprising:

receiving a plurality of signals transmitted from a device connected to an opposite side of a transfer route in a transfer path of the communication network;

separating the plurality of signals received in the receiving of the signals into the signal for the priority service and the signal for the standard service;

holding a plurality of signals for the standard service separated in the separating of the signal and defragmenting the plurality of signals for the standard service;

multiplexing each of the signal for the priority service separated in the separating of the signal and the signal for the standard service defragmented in the defragmenting of the signal;

buffering to hold the signal for each service multiplexed in the multiplexing of the signal;

determining a transfer order of the signals held in the buffering of the signal according to priorities of the signals;

copying and holding header information of the signal for the standard service of which the transfer order has been determined in the determining of the transfer order;

transmitting the signal for each service to a device connected to the transfer route in the transfer path;

performing an interruption process when the signal for the priority service arrives during the transfer of the signal for the standard service; fragmenting the signal for the standard service when the interruption process is performed in the performing of the transfer processing;

assigning the header information that is used for a transfer process held in the copying and holding of the header information to the signal for the standard service fragmented in the fragmenting of the signal;

and delaying the transfer of the signal for the standard service until the signal for the priority service has been transferred.

* * * * *